US011566749B2

(12) United States Patent
Eisses et al.

(10) Patent No.: US 11,566,749 B2
(45) Date of Patent: Jan. 31, 2023

(54) LUBRICANT INJECTOR

(71) Applicant: Lubecore International Inc., Campbellville (CA)

(72) Inventors: Jan Eisses, Campbellville (CA); John Smid, Branchton (CA)

(73) Assignee: Lubecore International Inc., Campbellville (CA)

( * ) Notice: Subject to any disclaimer, the term of this patent is extended or adjusted under 35 U.S.C. 154(b) by 311 days.

(21) Appl. No.: 16/630,758

(22) PCT Filed: Jul. 11, 2018

(86) PCT No.: PCT/CA2018/050845
§ 371 (c)(1),
(2) Date: Jan. 13, 2020

(87) PCT Pub. No.: WO2019/010575
PCT Pub. Date: Jan. 17, 2019

(65) Prior Publication Data
US 2020/0182401 A1 Jun. 11, 2020

Related U.S. Application Data

(60) Provisional application No. 62/532,493, filed on Jul. 14, 2017.

(51) Int. Cl.
*F16N 25/02* (2006.01)
*F16N 11/04* (2006.01)

(52) U.S. Cl.
CPC .............. *F16N 25/02* (2013.01); *F16N 11/04* (2013.01); *F16N 2210/14* (2013.01)

(58) Field of Classification Search
CPC ...... F16N 25/02; F16N 11/04; F16N 2210/14; F16N 27/00
See application file for complete search history.

(56) References Cited

U.S. PATENT DOCUMENTS 3,145,803 A * 8/1964 Cobert .................... F16N 25/00
184/7.4
7,726,448 B2 6/2010 Paluncic
(Continued)

FOREIGN PATENT DOCUMENTS

DE 20309553 U1 9/2003
DE 102004039353 A1 2/2006
(Continued)

OTHER PUBLICATIONS

WIPO, International Search Report )for parent application), dated Oct. 12, 2018.
(Continued)

*Primary Examiner* — Michael R Mansen
*Assistant Examiner* — Mark K Buse
(74) *Attorney, Agent, or Firm* — Laurence P. Colton; Smith Tempel Blaha LLC

(57) ABSTRACT

A lubricant injector used for dispensing a preselected amount of grease when the grease is delivered to the injector in a pressurized condition, the lubricant injector includes a generally cylindrical body which includes an upper grease reservoir adapted to selectively receive grease from a lower grease reservoir, wherein both reservoirs are filled with grease, the body includes a lower grease inlet and an upper grease outlet, the body also includes an inlet and an outlet. It further includes a shuttling spool slid-ably housed axially within the body wherein the shuttling spool is adapted to move axially upwardly upon application of pressurized grease at the inlet, and axially downwardly when the grease is not pressurized at the inlet such that upon application of pressurized grease at the inlet the shuttling spool is urged axially upwardly toward the outlet and configured to close off grease communication between the upper and lower grease reservoirs and substantially simultaneously open the (Continued)

inlet for communication of a preselected amount of grease into the lower grease reservoir. The lubricant injector is configured such that upon the preselected amount of grease entering the lower grease reservoir, simultaneously an equivalent amount of grease is dispensed from the outlet of the upper grease reservoir, and during this operation the upper and lower grease reservoirs are isolated.

8 Claims, 9 Drawing Sheets

(56) References Cited

U.S. PATENT DOCUMENTS

2005/0258004 A1 11/2005 Paluncic
2008/0289906 A1* 11/2008 Przybylsky ............. F16N 25/02
184/7.4
2009/0101443 A1* 4/2009 Kawai ................... F16N 25/02
700/282

FOREIGN PATENT DOCUMENTS

| DE | 102006001317 B4 | 5/2009 |
| EP | 0274559 B1 | 9/1990 |
| EP | 2012053 A1 | 1/2009 |
| FR | 2667381 B1 | 12/1992 |
| GB | 2086545 B | 6/1984 |
| WO | 2004113784 A1 | 12/2004 |

OTHER PUBLICATIONS

European Patent Office, Supplementary European Search Report (for related application), dated Mar. 5, 2021.

* cited by examiner

LUBRICANT INJECTOR

FIELD OF THE INVENTION

The present invention relates to lubricant injectors and more particularly to pressurized grease lubricant injectors.

BACKGROUND OF THE INVENTION

Metering or regulating valves incorporated in an automatic lubrication system, have been extensively used in the past. One of the major advantages of such a system arises from the fact that lubricant is dispensed in an automatic manner from a centralized point and is fed through a distributing system or network of tubes leading to the bearings to be lubricated. In this manner, one machine having a plurality of bearing points or an entire battery of machines may be lubricated at a fixed period.

Lubrication systems of this type usually include some type of measuring or control valve which regulate the amount of lubricant to be supplied during each lubrication cycle. The control valves embodied in systems of this type in the past have been complex in design and construction and therefore expensive to manufacture. Moreover, the valves supplied in the past have not been designed to inject the lubricant directly into each bearing and have not been susceptible to exact regulation, with the result that some of the bearings of a machine may be over-lubricated while other bearings may not receive sufficient lubrication.

The metering valve or lubricant injector is particularly suited for supplying metered charges of lubricant to several bearings of one machine or to the bearings of a battery of machines in response to surges of lubricant pressure developed in a centralized lubrication system including a lubricant pump which operates at timed intervals. The arrangement is such that the several injectors of the system operate independently of one another to deliver their specific-charge of lubricant to the bearing with which each particular injector is connected. Accordingly, the lubrication system will continue to feed lubricant until the last injector of the series, whether of large or small capacity, has discharged its metered charge, at which point, back pressure will build up in the system, causing it to bypass, so that pressure in the system drops to zero. At this point, the injectors return to a starting position, ready to deliver the metered charges of lubricant to the bearings during the next pressure surge.

SUMMARY OF SYSTEM

In the rest position both the main spring (also referred to as primary spring) and reload spring are preloaded. The grease injector seals off the mainline rest pressure (also referred to as rest pressure and grease pressure off condition) from the grease point at the lower shuttling spool seal.

Initial Shuttle Movement is as follows:
1. Pump pressure opens the shuttling spool (compresses the main spring)
2. Spool movement is limited to 4.71 mm.
3. Spool is pushed against cap inner surface.
4. Reload spring opens as spool opens but there is still preload present.
5. Grease flows throw ports in spool guide into cavity below the plunger.
Note: The shuttling spool never loses engagement at the top of the spool guide keeping it centered in all operational states.

Grease Delivery
6. Pump pressure pushes the plunger up and grease is delivered.
Note:
a. Volume delivered is the displaced volume under the plunger.
b. The top of the shuttling spool is ported to allow the grease to flow from the outside of the spool back to the inside of the injector.

Shuttling Spool Closes
7. As pressure is released the shuttling spool closes under the influence of the main spring (also referred to as primary spring).
8. The reload spring pushes the plunger down. Grease reloads through the spool guide.
Note:
a. The spool will close first because the main spring is ~3.5× stiffer than the reload spring.
b. The injector begins reloading when the seal passes the lower port making the main line pressure at reload higher than the injector cracking pressure.

Key Performance Indicators

TABLE 1

| Parameter | EP2 Grease Injector | EP0 Grease Injector |
| --- | --- | --- |
| Reload Pressure | 30 bar | 17 bar |
| Return Flow Volume | 0.08 cc | 0.08 cc |
| Return Flow Accuracy | <1% | <1% |
| Delivered Volume Accuracy | 13% | 7% |
| Priming Cycles (Dry Assembly) | #9-3 | #9-3 |
| | #0-23 | #0-23 |
| Priming Cycles (Wet Assembly) | #9-1 | #9-1 |
| | #0-6 | #0-6 |
| 12" Air in Mainline Push through Cycles | 3 | 3 |

Injector opening is independent of delivery. Therefore delivery happens at a higher pressure and delivery is quick and injectors can deliver EP2 grease. High reload pressures. Reload pressures higher than current injectors and much higher than competing injectors. Springs arranged in such a way that spring induced reaction pressure on grease doesn't subtract from grease delivery pressure. Reload cycle is simply flow through orifice holes, seals don't need to be overcome to reload the injector. Compact size for all injectors #0 through #9 injectors are all the same size. Keeps injector package in a smaller envelope. All seals are mechanically energized by compression rate. Current injector seals exhibit a higher interaction between pressure and sealing. Air works itself through the injectors quite well. Test had 50 ft of mainline pushing on a 12" pocket of air. ~80% of the air made it through the injectors on the third cycle with only a few bubbles following.

Due to the P1V1=P2V2 relationship in compressible fluids like air, the injectors pass a much greater volume of air than their grease metered volume (Volume of air decreases with delivery pressure and expands again as pressure is released on the reload cycle). Since the injector seals are constantly mechanically energized, the injector seals air very well allowing air pocket bleeding to be very effective.

Shuttling Spool Injector Reload Volume Return

Shuttling Spool injectors will return grease to reservoir. Return flow is 0.08 cc vs. 0.25 cc (state of the art). Example: A 24 point highway tractor system will return 1.92 cc of grease to the pump.

BRIEF DESCRIPTION OF THE DRAWINGS

The present concept will now be described by way of example only with reference to the following drawings in which.

DETAILED DESCRIPTION OF THE PREFERRED EMBODIMENTS

Figure 1:
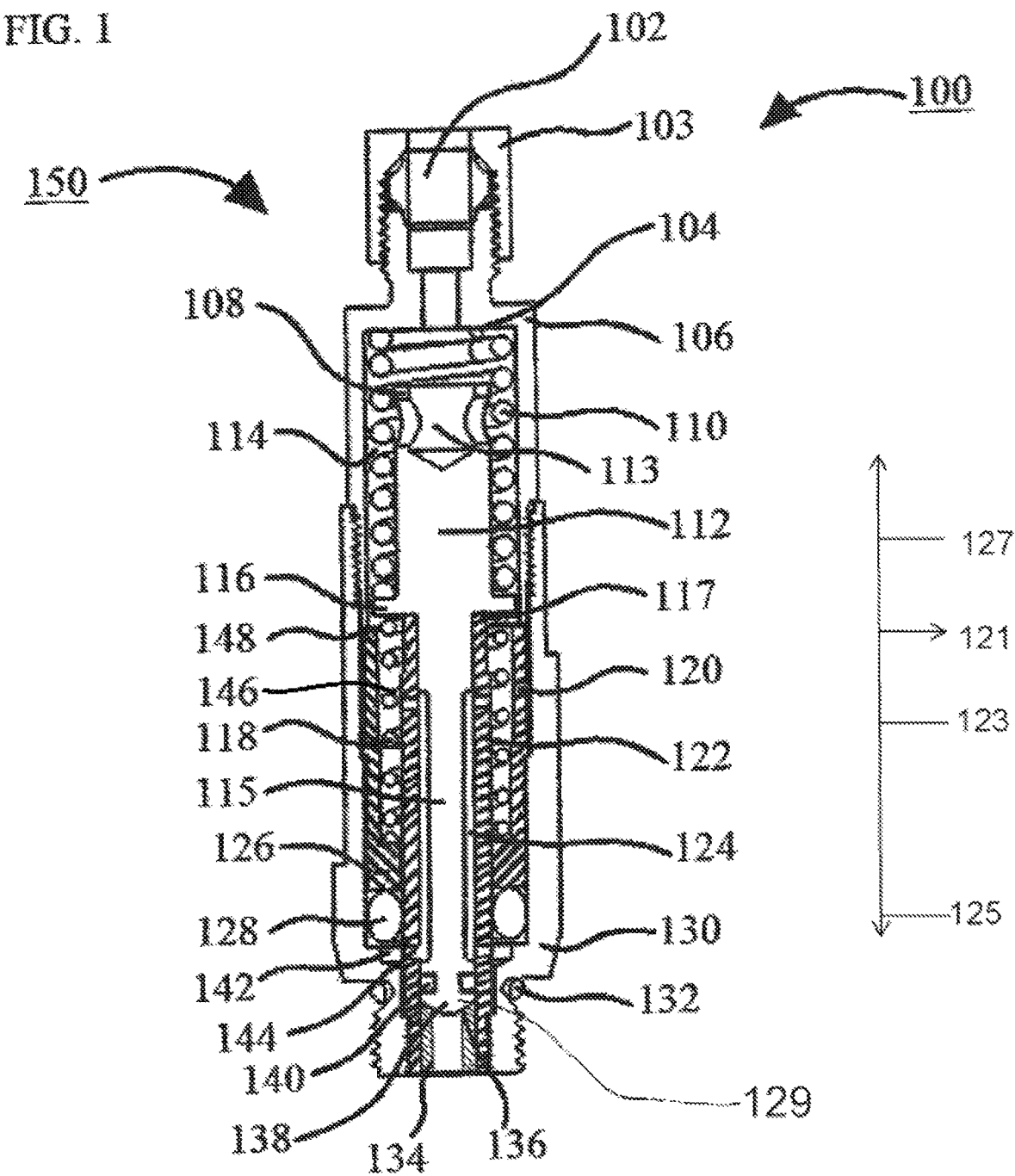
FIG. 1 is a cross schematic cross-sectional view of a lubricant injector.
Figure 2:
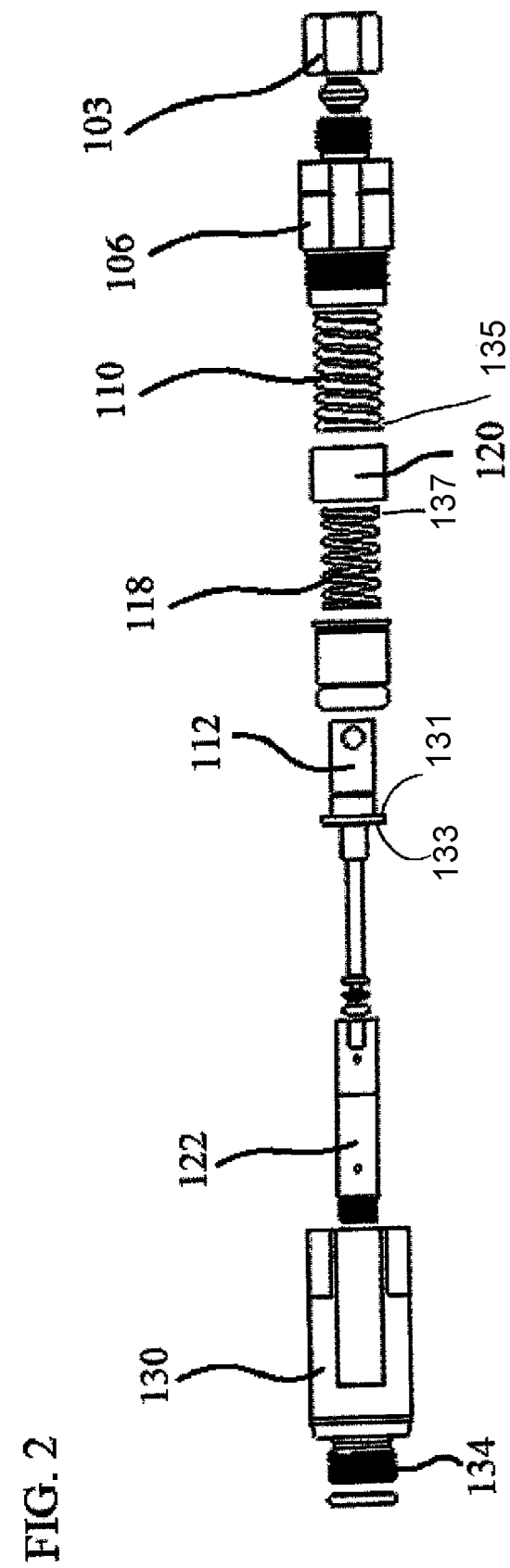
FIG. 2 is a schematic exploded view of the lubricant injector shown in FIG. 1.
Figure 3:
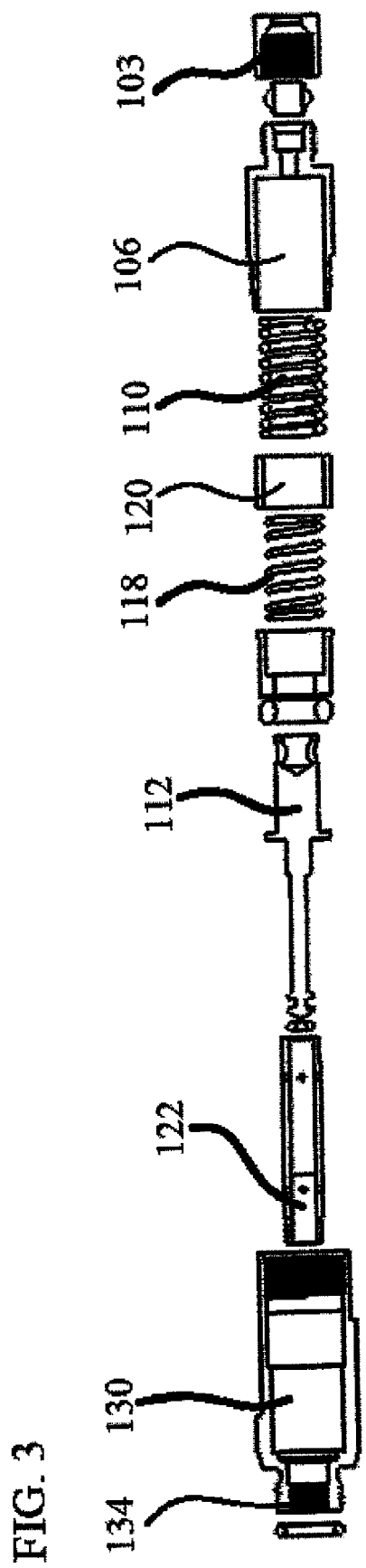
FIG. 3 is an exploded cross-sectional view of the lubricant injector shown in FIG. 2.

The present invention of lubricant injector 100 is depicted in FIGS. 1-3 and includes the following major components namely a body 130 connected to a cap 106 which together house a shuttling spool 112 slidably received within spool guide 122 and acting upon a primary spring 110 and a reload spring 118. Body 130 further includes inlet 134 and cap 106 further defines an outlet 102 and an outlet collar 103.

Body 130 further houses a spacer 120 the size of which ultimately controls the amount of grease lubricant injector 100 injects in a given cycle.

Looking more specifically to shuttling spool 112 which includes spool guide flange 116, grease outlet passageway 113 defined at the spool upper end 108, spool o-rings 140 at spool head 138 resting on lower spool stop 136.

Lubricant injector 100 is shown in the rest position 150 with grease at rest pressure whereas lubricant injector 100 will be shown in various operational positions in FIGS. 5, 6, 7 and 8 which will explain in more detail the operation of lubricant injector 100.

Spool guide 122 includes upper grease orifices 146 and lower grease orifices 144 which allow grease to flow through grease passageway 124. The space defined between spool lower section 115 and spool guide 122 is shown as grease passageway 124 and is the area within which grease flows when the lubricant injector 100 is put under grease pressure.

The reader will note that shuttling spool 112, in fact, shuttles back and forth and is shown in FIG. 1 in the closed position and/or the rest position 150. When shuttling spool 112 moves upwardly it will impinge upon upper spool stop 104 and when shuttling spool 112 moves downwardly it will impinge upon lower spool stop 117.

Body 130 further includes a plunger 126 housed between body 130 and spool guide 122 and is sealed off with plunger o-rings 128 and abuts against spacer 120 which in turn abuts against cap bottom surface 148 which acts as a spacer stop.

The lower grease reservoir 142 is defined as the space between bottom of plunger 126, spool guide 122 and the body near the lower section of body 130.

The space between the upper portion of shuttling spool 112 and cap 106 which houses primary spring 110 defines upper grease reservoir 114.

Inlet 134 also includes inlet o-rings 132 to ensure a positive seal against a body which lubricant injector 100 may be threaded into.

FIG. 2 shows lubricant injector 100 in a schematic exploded fashion and FIG. 3 shows lubricant injector 100 in a schematic cross-sectional exploded fashion.

Figure 4:
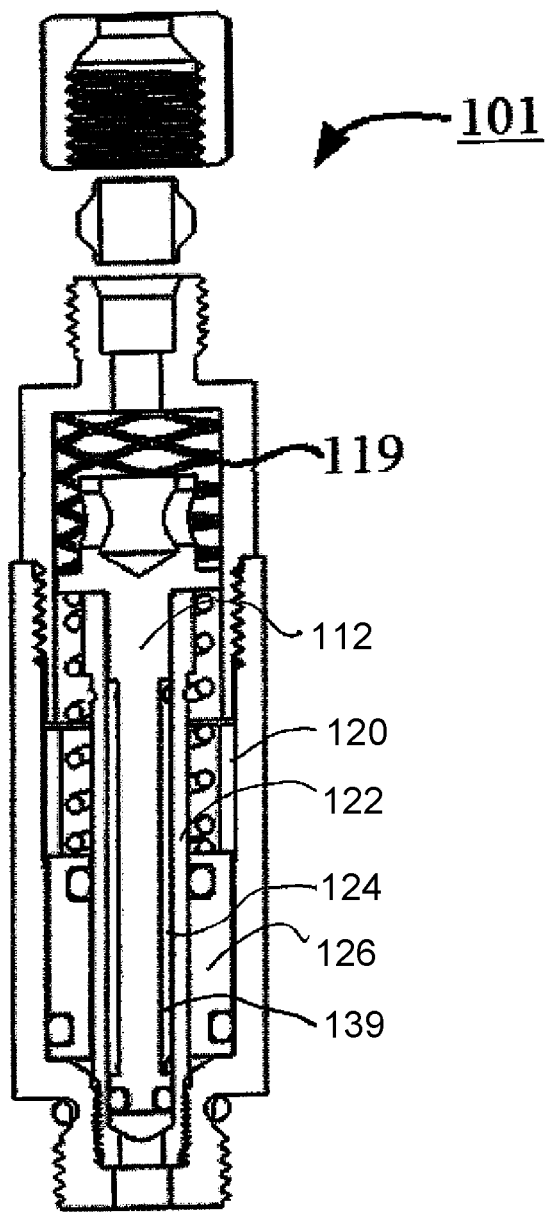
FIG. 4 is a schematic cross-sectional view of an alternate embodiment of the lubricant injector using a wave spring.

FIG. 4 shows an alternate embodiment of lubricant injector 100 in which primary spring 110 has been replaced with a wave spring 119 however in substantially all other aspects lubricant injector 101 shown in FIG. 4 functions identically to lubricant injector 100 shown in FIG. 1 except for the use of a wave spring 119 instead of primary spring 110 being a coil spring.

Lubricant injector 100 is for dispensing a preselected amount of grease when the grease is delivered to the injector in a pressurized condition, lubricant injector 100 includes:
  a) a generally cylindrical body 130 which may or may not include a separate cap 106 and further includes an upper grease reservoir 114 adapted to selectively receive grease from a lower grease reservoir 142, wherein both reservoirs are filled with grease, the body 130 includes a lower grease inlet 134 and an upper grease outlet 102; the body 130 includes an inlet 134 and an outlet 102
  b) a shuttling spool 112 is slid-ably housed axially within the body 130;
  c) wherein the shuttling spool 112 is adapted to move axially upwardly 127 upon application of pressurized grease at the inlet 134, and axially downwardly 125 when the grease is not pressurized at the inlet 134;
  d) such that upon application of pressurized grease at the inlet 134 the shuttling spool 112 is urged axially upwardly 127 toward the outlet 102 and configured to close off grease communication namely close off lower grease orifices 144 between the upper and lower grease reservoirs 114 and 142 and substantially simultaneously open the inlet for communication of a preselected amount of grease into the lower grease reservoir 142.

Preferably wherein the lubricant injector 100 is configured such that upon the preselected amount of grease entering the lower grease reservoir 142, simultaneously an equivalent amount of grease is dispensed from the outlet 102 of the upper grease reservoir 114, and during this operation the upper and lower grease reservoirs 114 and 142 are isolated meaning there is no grease communication between the two reservoirs since the grease passageway 124 is closed off.

Preferably wherein the lubricant injector 100 includes a primary spring 110 configured to bias the shuttling spool downwardly 125 closing off the inlet 134 in a rest position 150 which is when the grease at rest pressure. The reload spring is configured to bias the shuttling spool upwardly 127 toward an outlet 102.

Preferably wherein the shuttling spool includes a radial extending annular spool guide flange 116 spaced from a spool upper end 108, the spool guide flange 116 including an upper and lower surface 131 and 133, the upper surface 131 for receiving thereon a lower end 135 of the primary spring 110, and the lower surface 133 for receiving thereon an upper end 137 of the reload spring wherein the primary spring 110 and reload spring 118 are configured to bias against each other, further wherein the biasing force of the primary spring is greater than the biasing force of the reload spring thereby maintaining the inlet closed in the rest position. Preferably the primary spring 110 bias force is 2 to 4 time greater than the reload spring 118 and more preferably about 3 times greater bias. These springs may be coil springs, wave springs and any other type known in the art.

Preferably wherein the lubricant injector 100 includes a cylindrical spool guide 122 received along a lower portion or section 115 of the axial length of the shuttling spool 112 and surrounding the outside diameter of the shuttling spool 112 wherein a smaller diameter section 139 of the shuttling spool lower portion together with the inner diameter of the spool guide 122 defines an axially aligned grease passageway 124 for selectively communicating the preselected amount of grease from the lower grease reservoir 142 to the upper grease reservoir 114 when the grease at rest pressure and the shuttling spool 112 is in the rest position 150. The rest position occurs when there is rest pressure also referred to mainline rest pressure at inlet 134

Preferably wherein the lubricant injector 100 includes a cylindrical plunger 126 received slid-ably surrounding a portion of the axial length of an outer diameter of the spool guide 122, the plunger 126 separates the upper grease reservoir 114 from the lower grease reservoir 142, such that when the grease pressure is on the shuttling spool 112 moves axially upwardly 127 thereby closing off the grease passageway 124, and additionally the continued grease pressure raises the plunger 126 against the bias of the lower end of the reload spring 118 a preselected amount such that the cavity below the plunger 126 creates a lower grease reservoir 142 receiving the preselected amount of grease.

Preferably wherein when the grease pressure is on, the shuttling spool 112 closes off the grease passageway 124 by blocking lower grease orifice 144 and the plunger 126 moves upwardly 127 as the lower grease reservoir 142 is filled with the preselected amount of grease the upward movement 127 of the plunger simultaneously forces an equal amount of grease from the upper grease reservoir 114 out through the outlet 102.

Preferably when the grease pressure is off the shuttling spool moves to the rest position 150 thereby opening at least one lower grease orifice 144 allowing grease communication through the grease passageway thereby allowing the plunger to move downwardly under the reload spring downward bias which replenishes the upper grease reservoir with the preselected amount of grease.

Preferably wherein the lubricant injector 100 includes further including a cylindrical spacer 120 positioned axially between the top of the plunger 126 and a spacer stop 148 creating a gap 158 in the rest position which limits the upward travel of the plunger 126 and the amount of the preselected amount of grease, wherein decreasing the length of the spacer thereby increasing the gap 158 increases the preselected amount of grease.

Preferably wherein the lubricant injector 100 includes wherein the primary spring 110 is 2 to 4 times stiffer than the reload spring and more preferably 3 times.

In Use

I refer the reader to now FIGS. 5, 6, 7 and 8 which show the progression of the movement and position of the grease in the shuttling spool in the various components within the lubricant injector 100. It is understood that the entire lubricant injector 100 cavities are filled with grease however for illustration purposes the progression of grease flow is shown and at times as if it is being filled for the first time.

Figure 5:
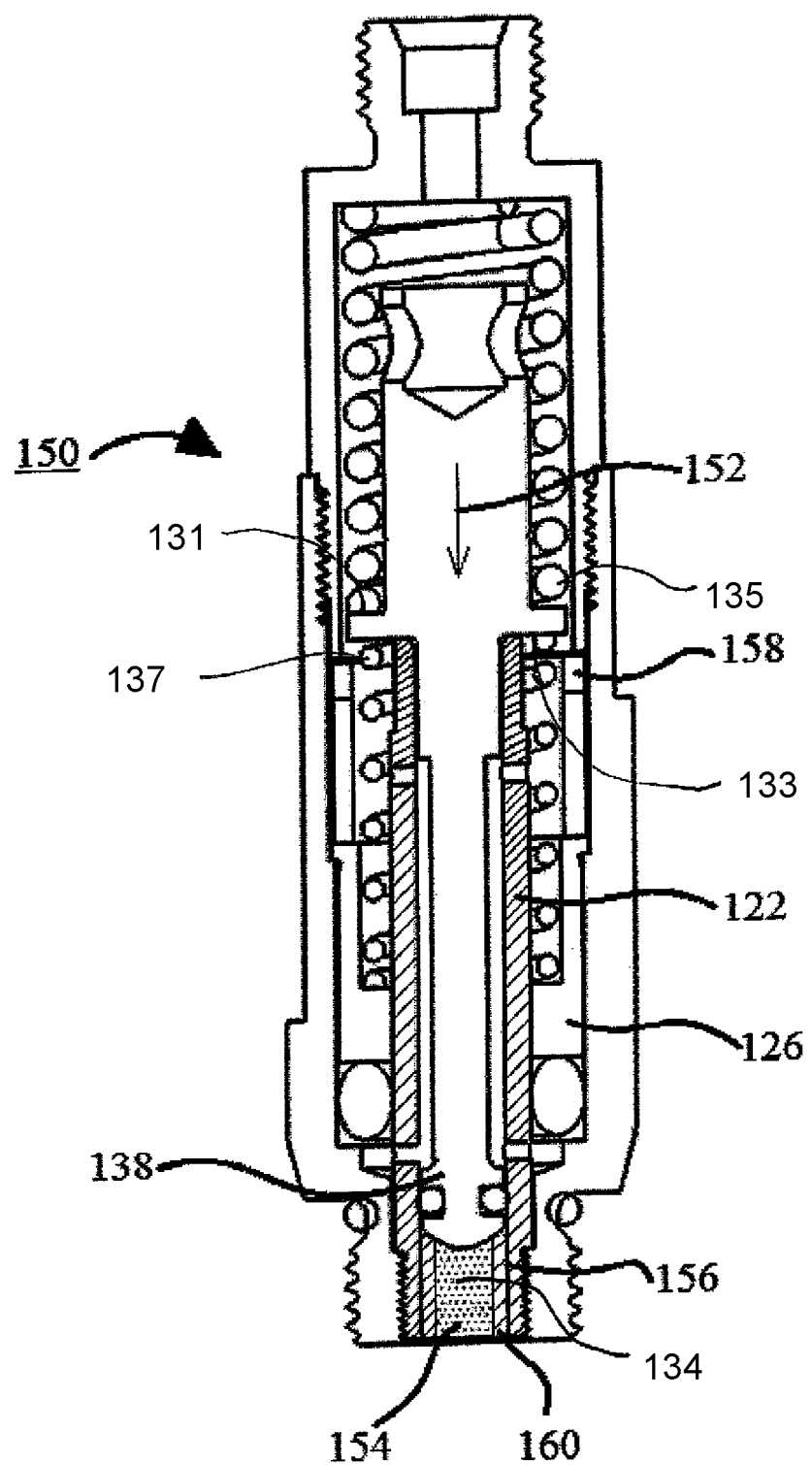
FIG. 5 is a schematic cross-sectional view of the lubricant injector shown in FIG. 1 shown in the position with grease at rest pressure.

First of all in FIG. 5 the lubricant injector 100 is shown in the rest position 150 in which inlet 134 is shown in inlet closed position 156 which is closed off by spool head 138, therefore grease flow is halted in position 150 and grease is at rest pressure.

Primary spring 110 creates primary spring bias 152 forcing shuttling spool 112 downwardly into spool head 138 placing it in the inlet closed position 156. The reader will note there is a gap 158 between the spacer 120 and the spacer stop 148.

Figure 6:
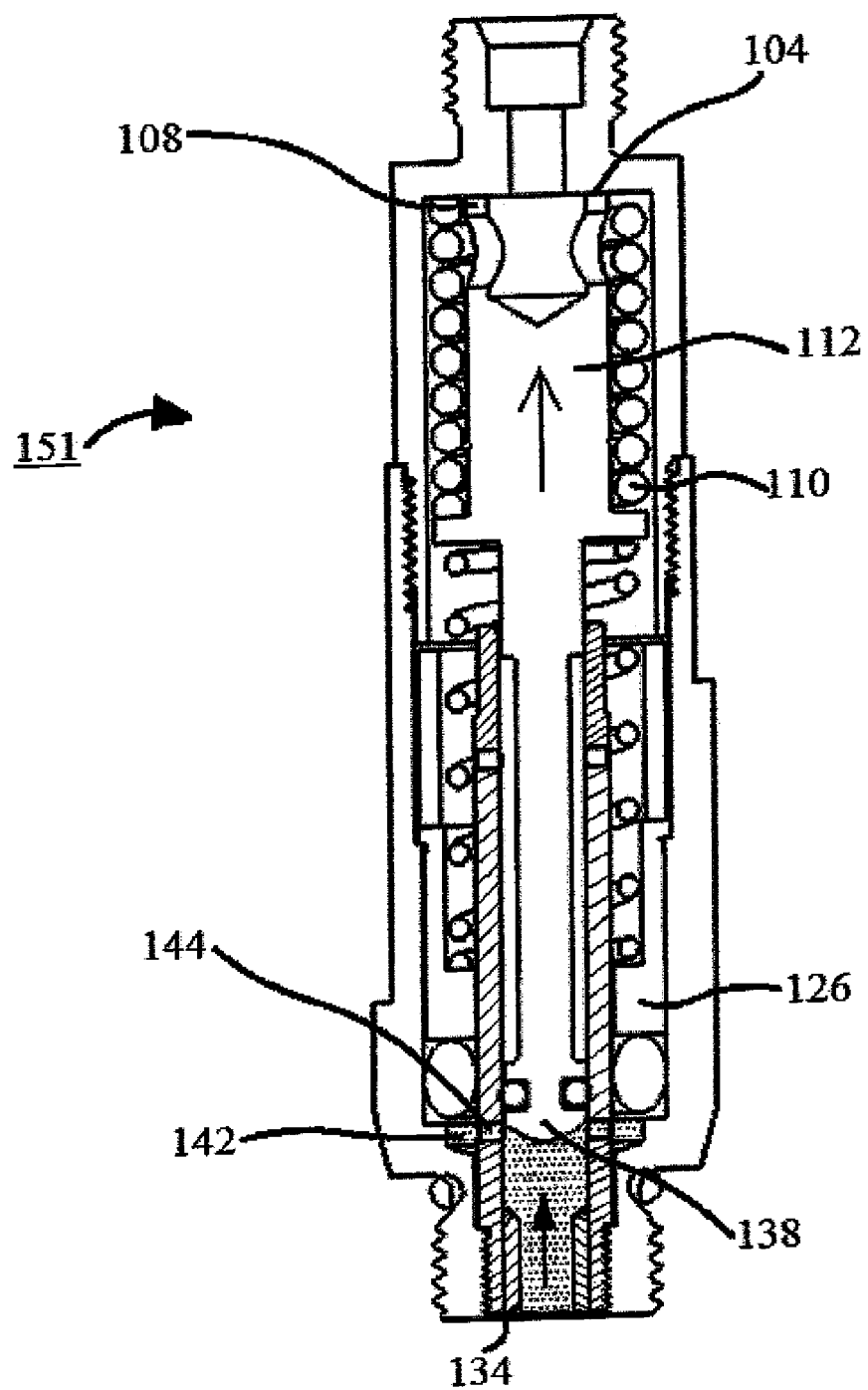
FIG. 6 is a schematic cross-sectional view of the lubricant injector shown in FIG. 1 shown in the position with grease pressure on and the shuttling spools opens.

Referring now to FIG. 6 which shows lubricant injector 100 in a grease pressure on condition in which shuttling spool 112 moves upwardly to position 151.

With grease pressure on grease it enters through inlet 134 and pushes shuttling spool 112 upwardly until shuttling spool 112 makes contact with upper spool stop 104.

At this point spool head 138 has been urged past lower grease orifices 144 thereby allowing grease to enter through these lower grease orifices 144 into lower grease reservoir 142 which thereby commences displacement of plunger 126 upwardly as shown in the next diagram.

The reader will note that with grease pressure on shuttling spool 112 compresses primary spring 110 to the point where shuttling spool 112 makes contact with upper spool stop 104.

Figure 7:
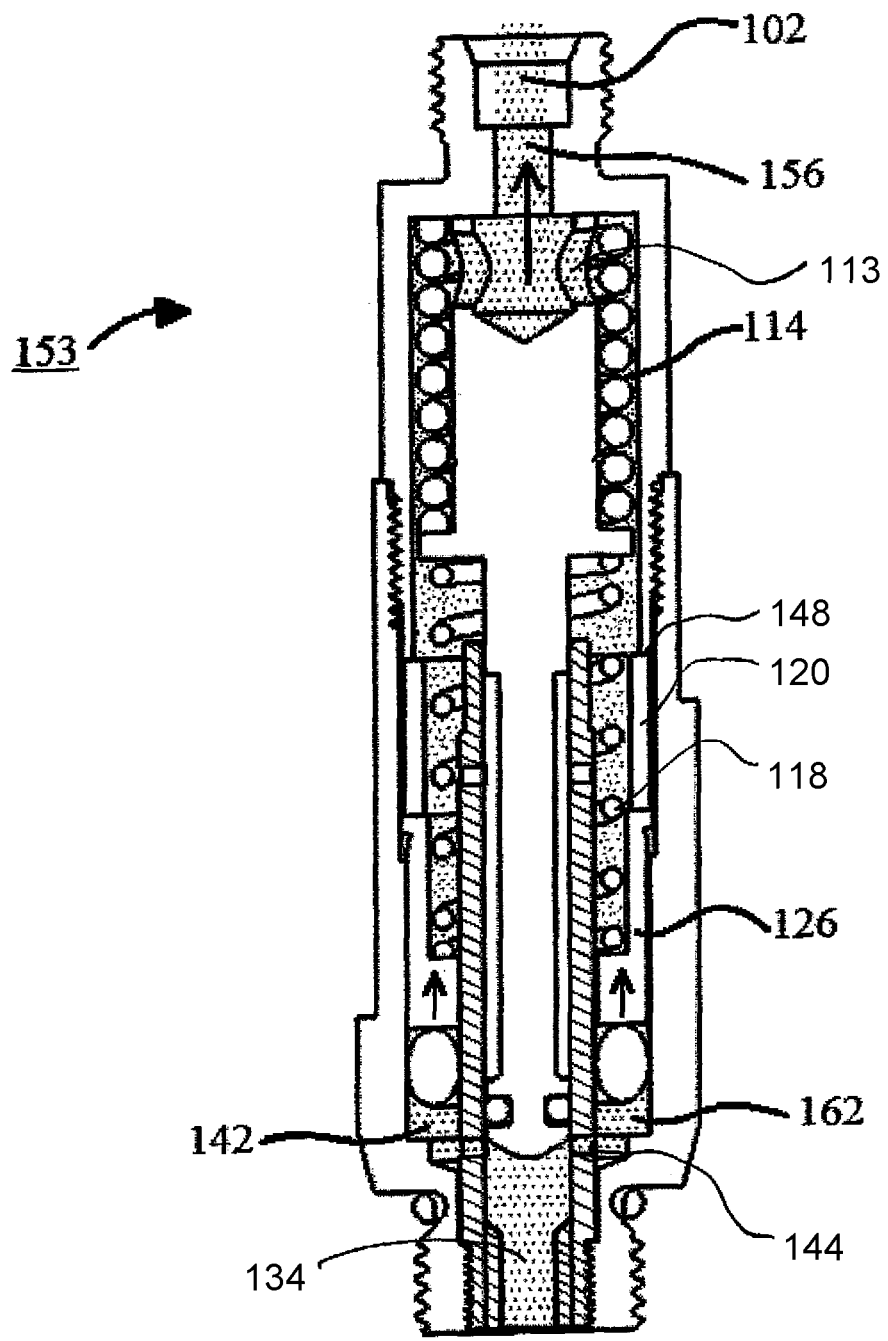
FIG. 7 is a schematic cross-sectional view of the lubricant injector shown in FIG. 1 shown in the position with grease pressure on showing plunger sliding up and grease delivered out of injector.

Referring now to FIG. 7 which shows lubricant injector 100 in a grease pressure on condition wherein plunger 126 moves upwardly to position 153. In this position 153 the grease pressure is still on and grease continues to enter through inlet 134 and since it can no longer move shuttling spool 112 upwardly since spool upper end 108 is now abutting against upper spool stop 104 grease continues to enter through lower grease orifices 144 thereby increasing the amount of grease that accumulates in lower grease reservoir 142 thereby urging upwardly plunger 126 against the bias of reload spring 118.

Plunger 126 will move upwardly and continue to increase the amount of grease in lower grease reservoir 142 until plunger 126 together with spacer 120 abuts against spacer stop 148. This continues until lower grease reservoir 142 is filled to a preselected charge volume 162. The size of spacer 120 determines the charge volume 162.

Figure 8:
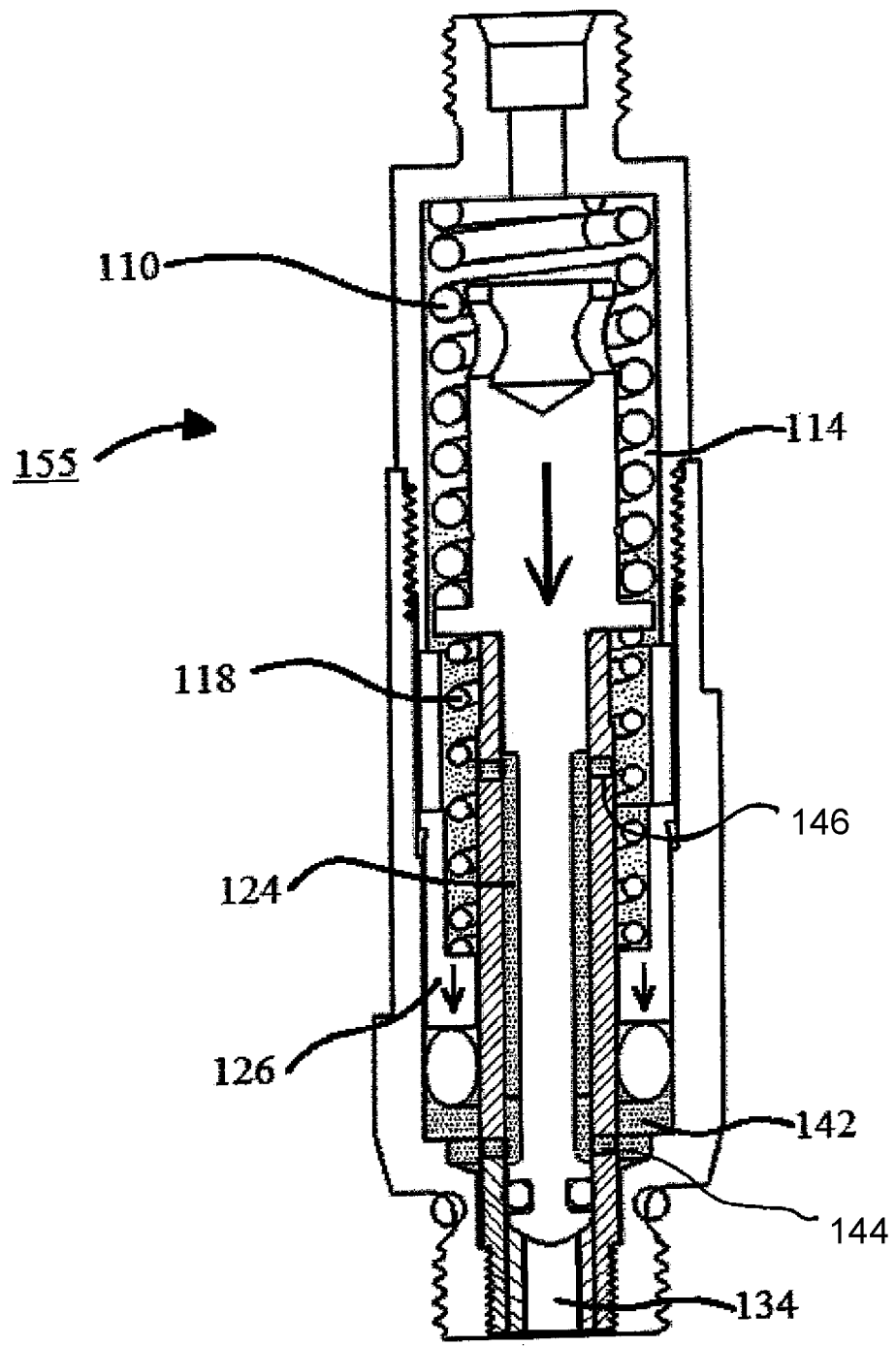
FIG. 8 is a schematic cross-sectional view of the lubricant injector shown in FIG. 1 shown in the position with grease at rest pressure plunger slides down.
Figure 9:
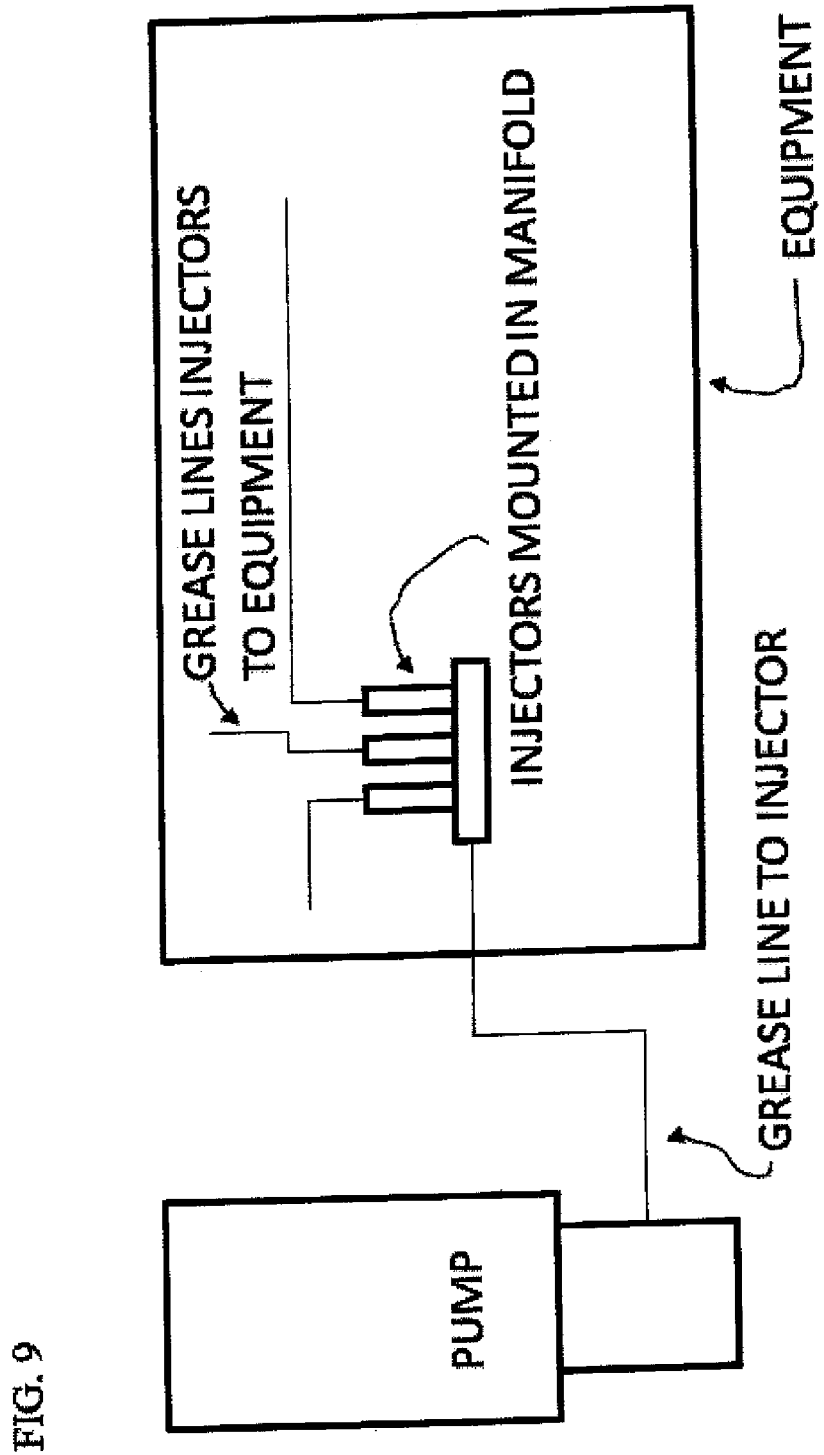
FIG. 9 is a schematic flow diagram of a basic system overview showing lubricant injectors mounted to a manifold and connected to a pump on one end and to various points of the equipment at the outlet end of each lubricant injector.

Referring now to FIG. 8 which shows the lubricant injector 100 in a grease pressure off condition (also referred to as grease at rest pressure herein) in which shuttling spool moves downwardly to position 155. Once the grease pressure is turned off (also referred to as grease at rest pressure herein), shuttling spool 112 will move downwardly and close off inlet 134 under the primary spring 110 pressure.

Additionally, reload spring 118 pushes plunger 126 downwardly thereby forcing grease from the lower grease reservoir 142 through lower grease orifice 144 up along grease passageways 124 and out through upper grease orifice 146 into upper grease reservoir 114 thereby charging upper grease reservoir 114 with the next cycle of the lubricant injector 100.

The reader will note that the primary spring 110 is approximately 3 and a half times stiffer than the reload spring 118 thereby facilitating the movements as described.

Going back to FIG. 7 the amount of grease that has been charged into the upper grease reservoir 114 as described above during the grease pressure on plunger 126 moves to upwardly position 153 a pre-selected volume of grease which is housed within upper grease reservoir 114 is urged through grease outlet passageway 113 and out through outlet 102 thereby providing a pre-selected volume out 156 of grease to the equipment point that must be greased.

Advantages

The present lubricant injector 100 due to its design has a number of beneficial properties as will be described below.

Firstly the injector opening is independent of grease delivery and therefore grease delivery happens at a higher pressure and more quickly than other lubricant injectors.

Lubricant injector is designed in such a fashion that it can deliver thick greases such as EP2 grease even in cold weather conditions.

Lubricant injector 100 has much higher reload pressures than other lubricant injectors on the market.

The design of lubricant injector 100 is in such a manner that there is no spring induced reaction pressure on the grease which in other designs subtracts from the grease delivery pressure.

Lubricant injector 100 is designed such that in the reload cycle grease is simply flowed through orifice holes and seal pressures do not need to be overcome in order to initiate the reload of the injector.

The design of lubricant injector 100 is such that the sealing methodology used is of much higher quality, consistency, and reliability.

Lubricant injector 100 is designed such that the seals within lubricant injector 100 are all mechanically energized by the compression rate. In other words, the injector seals exhibit a higher interaction between pressure and sealing, therefore, the higher the pressure the greater the sealing that will occur within lubricant injector 100.

Lubricant injector 100 is designed in such manner that air can work itself through the injector quite easily. A test conducted with 50 feet of main line pushed a 12 inch pocket of air through lubricant injector at such a rate that 80% of the air was completely passed through lubricant injector 100 on the third cycle with only a few bubbles following.

The reservoir return flow is approximately 0.08 ccs versus the current standard in the industry of approximately 0.25 cc's, which is approximately ⅓ less return flow. The minimal amount of grease returned to the reservoir has positive benefits in the field for the use of lubricant injector 100. For example, return flow is always a consideration in system design and for most parallel systems one must accommodate a margin in the maximum delivered volume to accommodate the return flow. Therefore, significantly smaller reservoirs can be safely used. In practice ⅓ the size of current known systems.

What is claimed is:

1. A lubricant injector used for dispensing a preselected amount of grease when the grease is delivered to the injector in a pressurized condition, the lubricant injector includes:
   a) a generally cylindrical body which includes an upper grease reservoir adapted to selectively receive grease from a lower grease reservoir, wherein both reservoirs are filled with grease, the body includes a lower grease inlet and an upper grease outlet; and
   b) a shuttling spool slid-ably housed axially within the body,
   wherein the shuttling spool is adapted to move axially upwardly upon application of pressurized grease at the grease inlet, and axially downwardly when the grease is not pressurized at the grease inlet such that upon application of pressurized grease at the grease inlet the shuttling spool is urged axially upwardly toward the grease outlet and configured to close off grease communication between the upper and lower grease reservoirs and substantially simultaneously open the inlet for communication of a preselected amount of grease into the lower grease reservoir,
   wherein the lubricant injector is configured such that upon the preselected amount of grease entering the lower grease reservoir, simultaneously an equivalent amount of grease is dispensed from the grease outlet of the upper grease reservoir, and during this operation the upper and lower grease reservoirs are isolated,
   wherein the lubricant injector includes a primary spring configured to bias the shuttling spool downwardly closing off the grease inlet in a rest position when the grease is at a rest pressure; and a reload spring configured to bias the shuttling spool upwardly toward the grease outlet.

2. The lubricant injector claimed in claim 1 wherein the shuttling spool includes a radial extending annular spool guide flange spaced from a spool upper end, the spool guide flange including an upper and lower surface, the upper surface for receiving thereon a lower end of the primary spring, and the lower surface for receiving thereon an upper end of the reload spring wherein the primary spring and reload spring are configured to bias against each other, further wherein the biasing force of the primary spring is greater than the biasing force of the reload spring thereby maintaining the grease inlet closed in the rest position and grease is at the rest pressure.

3. The lubricant injector claimed in claim 2 further includes a cylindrical spool guide received along a lower portion of the axial length of the shuttling spool and surrounding the outside diameter of the shuttling spool wherein a smaller diameter section of the shuttling spool lower portion together with the inner diameter of the spool guide defines an axially aligned grease passageway for selectively communicating the preselected amount of grease from the lower grease reservoir to the upper grease reservoir when the grease is at the rest pressure, and the shuttling spool is in the rest position.

4. The lubricant injector claimed in claim 3 further including a cylindrical plunger received slid-ably surrounding a portion of the axial length of an outer diameter of the spool guide, which separates the upper grease reservoir from the lower grease reservoir, such that when the grease pressure is on, the shuttling spool moves axially upwardly thereby closing off the grease passageway, and the continued grease pressure raises the plunger against the bias of the lower end of the reload spring a preselected amount such that the lower grease reservoir receives the preselected amount of grease.

5. The lubricant injector claimed in claim 4 wherein when the grease pressure is on the shuttling spool closes off the grease passageway and the plunger moves upwardly as the lower reservoir is filled with the preselected amount of grease the upward movement of the plunger simultaneously forces an equal amount of grease from the upper grease reservoir out through the grease outlet.

6. The lubricant injector claimed in claim 5 wherein when the grease is at the rest pressure the shuttling spool moves to the rest position thereby opening at least one lower grease orifice allowing grease communication through the grease passageway thereby allowing the plunger to move downwardly under the reload spring downward bias which replenishes the upper grease reservoir with the preselected amount of grease.

7. The lubricant injector claimed in claim 6 further including a cylindrical spacer positioned axially between the top of the plunger and a spacer stop creating a gap in the rest position which limits the upward travel of the plunger and the amount of the preselected amount of grease, wherein decreasing the length of the spacer thereby increasing the gap increases the preselected amount of grease.

8. The lubricant injector claimed in claim 1 wherein the primary spring is 2 to 4 times stiffer than the reload spring.

\* \* \* \* \*